US010121385B2

(12) United States Patent
Guignard et al.

(10) Patent No.: US 10,121,385 B2
(45) Date of Patent: Nov. 6, 2018

(54) METHOD AND DEVICE FOR ESTIMATING A LATERAL SPEED AND A LATERAL POSITION OF AN AIRCRAFT, DURING A PHASE WHERE THE AIRCRAFT IS TRAVELING ON THE GROUND

(71) Applicant: AIRBUS OPERATIONS (S.A.S.), Toulouse (FR)

(72) Inventors: Fabien Guignard, Colomiers (FR); Priteche Venilal, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 27 days.

(21) Appl. No.: 15/364,203

(22) Filed: Nov. 29, 2016

(65) Prior Publication Data

US 2017/0162068 A1 Jun. 8, 2017

(30) Foreign Application Priority Data

Dec. 8, 2015 (FR) ...................................... 15 62026

(51) Int. Cl.
*G08G 5/06* (2006.01)
*B64D 43/00* (2006.01)
(Continued)

(52) U.S. Cl.
CPC ............. *G08G 5/065* (2013.01); *B64D 43/00* (2013.01); *G01C 21/165* (2013.01); *G01C 23/00* (2013.01);
(Continued)

(58) Field of Classification Search
None
See application file for complete search history.

(56) References Cited

U.S. PATENT DOCUMENTS 4,482,961 A * 11/1984 Kilner .................. G05D 1/0083
244/183
6,671,588 B2 * 12/2003 Otake ..................... B64C 25/48
244/175
(Continued)

FOREIGN PATENT DOCUMENTS

FR 2 916 074 A1 11/2008

OTHER PUBLICATIONS

French Search Report for Application No. 1562026 dated Aug. 22, 2016.

*Primary Examiner* — Rami Khatib
(74) *Attorney, Agent, or Firm* — Jenkins, Wilson, Taylor & Hunt, P.A.

(57) ABSTRACT

Method and device for estimating lateral speed and lateral position of an aircraft during a phase where the aircraft is traveling on the ground. The device includes a unit for determining an initial lateral position value, corresponding to lateral position with respect to axis of a runway when touching down on landing, a unit for repetitively determining, at least from runway touch down, current ground speed and a current lateral angular deviation, representing angular deviation between the current route and the heading of the runway, a unit for repetitively computing current lateral speed, from the current ground speed and current lateral angular deviation, a unit for computing a current lateral position, from current lateral speed and initial lateral position, and a link for transmitting the current lateral speed and/or the current lateral position to at least one user system.

19 Claims, 2 Drawing Sheets

(51) Int. Cl.
  *G01C 21/16*  (2006.01)
  *G01C 23/00*  (2006.01)
  *G05D 1/00*  (2006.01)
  *G08G 5/02*  (2006.01)
  *G08G 5/00*  (2006.01)

(52) U.S. Cl.
  CPC ......... *G05D 1/0083* (2013.01); *G08G 5/0021* (2013.01); *G08G 5/025* (2013.01)

(56) References Cited

U.S. PATENT DOCUMENTS

| | | | |
|---|---|---|---|
| 8,584,989 B2* | 11/2013 | Lemay | G05D 1/0083 188/382 |
| 8,666,598 B2* | 3/2014 | Lemay | G05D 1/0083 180/14.6 |
| 9,213,334 B2* | 12/2015 | Veronesi | G05D 1/0083 |
| 9,802,696 B2* | 10/2017 | Garaygay | B64C 25/50 |
| 2009/0005920 A1* | 1/2009 | Colomer | G01S 1/026 701/14 |
| 2015/0307207 A1* | 10/2015 | Meunier | G08G 5/02 701/4 |

\* cited by examiner

METHOD AND DEVICE FOR ESTIMATING A LATERAL SPEED AND A LATERAL POSITION OF AN AIRCRAFT, DURING A PHASE WHERE THE AIRCRAFT IS TRAVELING ON THE GROUND

CROSS-REFERENCE TO RELATED APPLICATION

This application claims the benefit of and priority to French patent application number 15 62026 filed on Dec. 8, 2015, the entire disclosure of which is incorporated by reference herein.

TECHNICAL FIELD

The present disclosure relates to a method and a device for estimating a lateral speed and a lateral position of an aircraft, in particular of a transport airplane, during a phase in which the aircraft is traveling on the ground on a runway after a landing.

The landing of an aircraft ends with a phase of traveling on the ground (called "rollout") which follows the actual landing. The purpose of this rollout phase is to capture and follow the central longitudinal axis of the runway, in order to avoid leaving the runway. This phase starts at the time the aircraft touches down on the ground and ends when the pilot decides to move onto a runway exit.

BACKGROUND

Generally, while traveling on the ground, the computer, for example a guidance computer of the aircraft, which computes the guidance commands, determines the lateral deviation and the lateral speed of the aircraft with respect to the axis of the runway, using the signal of a "Localizes" (LOC) beacon of an instrument landing system of the ILS ("Instrument Landing System") type. This signal is supplied to it by a multimode receiver of the MMR ("Multi Mode Receiver") type. This signal gives, in the nominal case, an estimation of the position with respect to the center of a beam which is supposed to be collinear with the axis of the runway. However, this signal can be interfered with and such an interference has a direct impact on the estimated position and speed of the aircraft and therefore on the guidance on the ground. In general, the interferences exhibit only high frequency components, which have less impact on the guidance (because they are easily manageable by a computer). However, it can occur that low frequency noises appear on the MMR data coming from the multimode receiver. This can occur, for example, if the engine speed has the same frequency as the LOC signal, if a vehicle passes in front of the LOC beacon, or if a building reflects the signal. In these cases, the multimode receiver of the MMR type sends the sum of the two signals. The usual use of the multimode receiver for estimating the lateral speed and the lateral position is not therefore optimal in all situations.

SUMMARY

A purpose of the present disclosure is to overcome this disadvantage. The subject matter herein discloses a method for estimating a current lateral speed and a current lateral position of an aircraft, during a phase where the aircraft is traveling on the ground on a runway after a landing, making it possible to produce very accurate estimations, whatever the situations may be.

According to the disclosure herein, the method comprises:
- a first data generation step, implemented by a first data generation unit, comprising or consisting of determining a lateral position value, called the initial lateral position, this initial lateral position corresponding to a lateral position value of the aircraft with respect to a central longitudinal axis of the runway, at the time of the touchdown on the runway on landing;
- a second data generation step, implemented by at least a second data generation unit, comprising or consisting of repetitively determining, at least from the time of the aircraft touching down on the runway when landing, a current ground speed of the aircraft and a current lateral angular deviation from at least inertial information, the current lateral angular deviation representing the angular deviation between the current route of the aircraft and the heading of the runway;
- a first computation step, implemented by a first computation unit, comprising or consisting of repetitively computing the current lateral speed of the aircraft, from the current ground speed and from the current lateral angular deviation;
- a second computation step, implemented by a second computation unit, comprising or consisting of computing a current lateral position, from the current lateral speed and from the initial lateral position; and
- an information transmission step, implemented by a data transmission link, comprising or consisting of transmitting to at least one user system at least one of the following parameters: the current lateral speed computed in the first computation step, the current lateral position computed in the second computation step.

Advantageously, the first data generation step uses a multimode receiver as the first data generation unit.

Thus, thanks to the disclosure herein, the estimations (or computations) of the lateral position (Yrollout) and of the lateral speed (VYrollout) on the ground are carried out principally by using data (inertial data, . . . ) which are independent of a multimode receiver. The use of the multimode receiver of the MMR type is minimized and limited to the initialization just before the touchdown, where it is in principle accurate. In this way very accurate estimations of the lateral speed and of the lateral position are obtained, whatever the situations may be.

Moreover, advantageously, the method comprises a first processing step, implemented prior to the first data generation step by a first processing unit and comprising or consisting of monitoring a lateral position generated by the multimode receiver when the aircraft is in flight, so as to be able to detect a noisy lateral position value, and the first data generation step comprises or consists of determining a zero value for the initial lateral position, in the event of detection of a noisy lateral position value.

Moreover, advantageously, the first data generation step comprises or consists of comparing a value generated by the multimode receiver with a threshold value, and:
- if the generated value is less than or equal to the threshold value, using that generated value as the initial lateral position;
- otherwise, using an auxiliary value as the initial lateral position.

Preferably, the auxiliary value corresponds to one of the following values:
- the threshold value;
- zero.

Moreover, advantageously, at least the first data generation step comprises or consists:

of carrying out at least one monitoring of the aircraft so as to be able to detect at least one of the following events:
a compression of a main landing gear of the aircraft;
a putting of the wheels of the aircraft into rotation; and
a zero height of the aircraft with respect to the ground; and
of determining the time that the aircraft touches down on the runway, from at least a time of detection of at least one of the events.

Advantageously, the second data generation step comprises or consists of determining at least one of the following parameters: the current ground speed of the aircraft, the current lateral angular deviation, from hybridized data obtained from inertial data and from data coming from a satellite positioning system.

Moreover, advantageously, the second computation step comprises or consists of computing the current lateral position Yc, from the following expression:

$$Yc = \int V_Y c + Y_0$$

wherein:
$V_Y c$ is the current lateral speed; and
$Y_0$ is the initial lateral position.

The present disclosure also relates to a device for estimating a current lateral speed and a current lateral position of an aircraft, in particular of a transport airplane, during a phase in which the aircraft is traveling on the ground on a runway after a landing.

According to the disclosure herein, the estimation device comprises:
a first data generation unit configured for determining a lateral position value, called the initial lateral position, this initial lateral position corresponding to a lateral position value of the aircraft with respect to a central longitudinal axis of the runway, when touching down on the runway on landing;
a second data generation unit configured for repetitively determining, at least from the time of the touchdown of the aircraft on the runway, a current ground speed of the aircraft and a current lateral angular deviation, the current lateral angular deviation representing the angular deviation between the current route of the aircraft and the heading of the runway;
a first computation unit configured for repetitively computing the current lateral speed of the aircraft, from the current ground speed and from the current lateral angular deviation;
a second computation unit configured for computing a current lateral position, from the current lateral speed and from the initial lateral position; and
a data transmission link configured for transmitting to at least one user system at least one of the following parameters: the current lateral speed computed by the first computation unit, the current lateral position computed by the second computation unit.

In a preferred embodiment:
the first data generation unit corresponds to a multimode receiver;
the second data generation unit comprises at least an inertial data system and a sensor associated with a satellite positioning system.

The present disclosure also relates to an aircraft, in particular a transport airplane, which is provided with an estimation device such as described above.

BRIEF DESCRIPTION OF THE FIGURES

The appended figures will give a good understanding of how the disclosure herein can be embodied. In these figures, identical references denote similar elements. More particularly.

DETAILED DESCRIPTION

Figure 1:
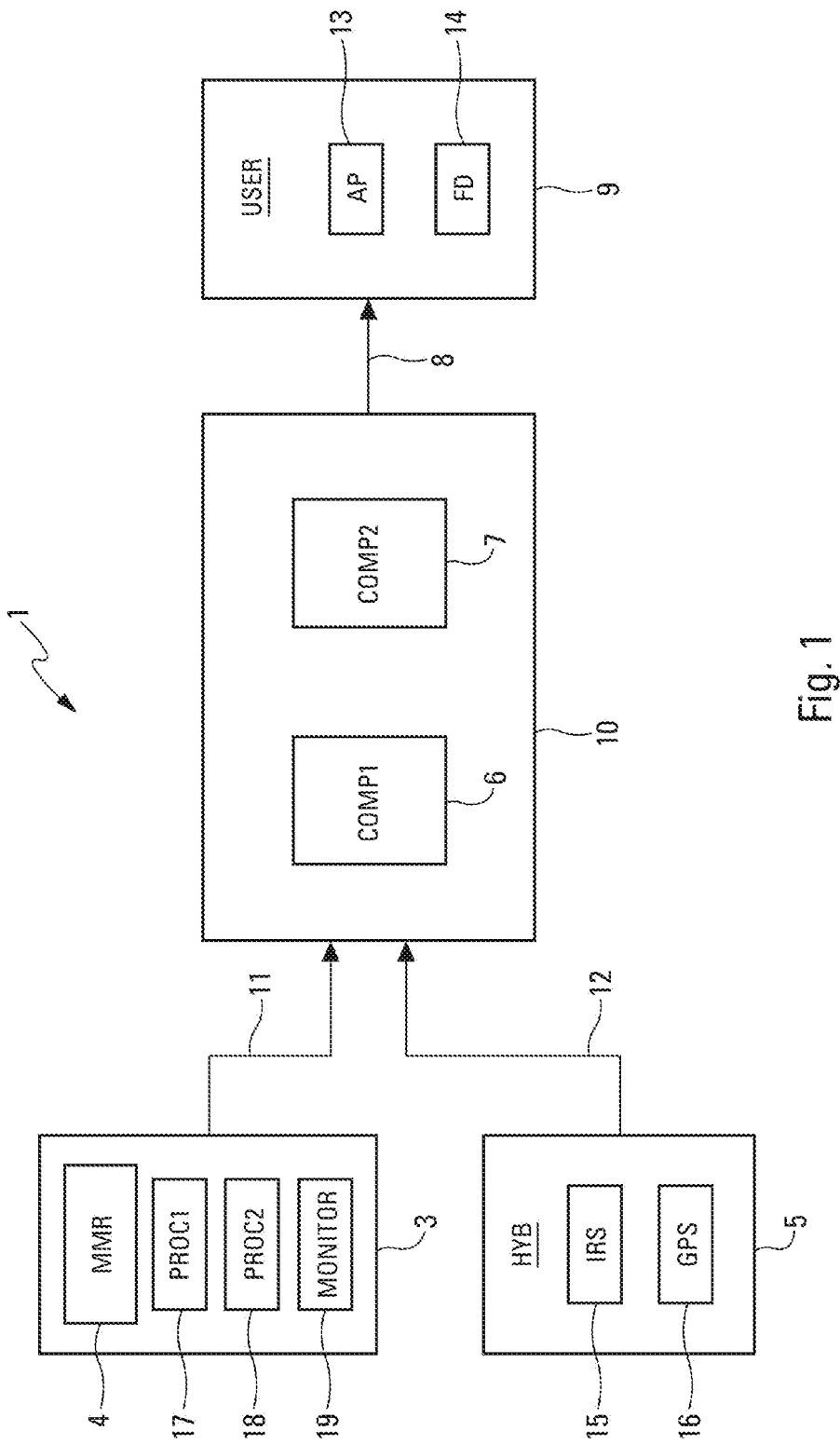
FIG. 1 is a block diagram of a particular embodiment of an estimation device according to the disclosure herein.
Figure 2:
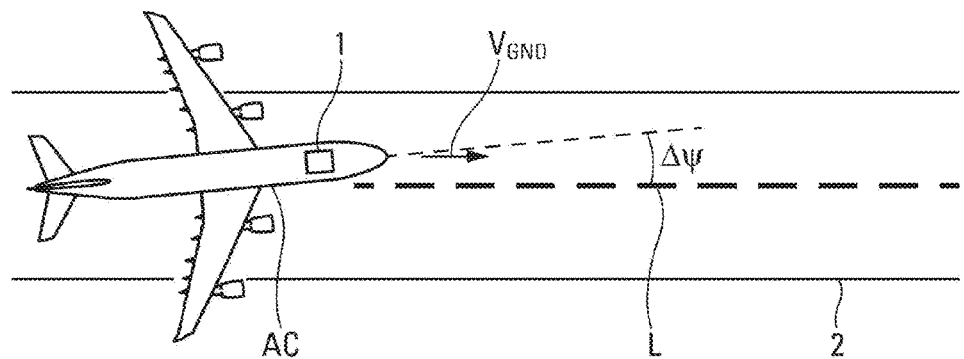
FIG. 2 diagrammatically shows an aircraft traveling on a runway.

The estimation device 1 shown diagrammatically in FIG. 1 and making it possible to illustrate the disclosure herein is intended for estimating a current lateral speed and a current lateral position of an aircraft AC (FIG. 2), in particular of a transport airplane, during a phase where the aircraft AC is traveling on the ground on a runway 2 after a landing. FIG. 2, also shows the central longitudinal axis L of the runway 2.

According to the disclosure herein, the estimation device 1 which is installed onboard the aircraft, comprises, as shown in FIG. 1:
a data generation unit 3, which preferably comprises a multimode receiver 4 of the MMR (standing for "Multi Mode Receiver") type and which is configured for determining a lateral position value, called the initial lateral position. This initial lateral position $Y_0$ corresponds to a lateral position value of the aircraft AC with respect to the central longitudinal axis L of the runway 2 (FIG. 2), that is to say the distance on the ground of the aircraft orthogonally to the central longitudinal axis L, at the time of the touchdown on (or first contact with) the runway 2 by wheels of the aircraft on landing (after a flight);
a data generation unit 5, preferably a hybridation unit ("HYB" standing for "Hybridation Unit"), described below and configured for repetitively determining, at least from the time of the touchdown of the aircraft on the runway, a current ground speed $V_{GND}$ (in the form of a numerical value) of the aircraft and a current lateral angular deviation $\Delta\Psi$ (FIG. 2). The current lateral angular deviation $\Delta\Psi$ represents the angular deviation between the current route of the aircraft and the heading of the runway;
a computation unit 6 ("COMP1" standing for "Computation Unit") configured for repetitively computing the current lateral speed $V_Y c$ of the aircraft, from the current ground speed $V_{GND}$ and from the current angular lateral deviation $\Delta\Psi$, received from the data generation unit 5;
a computation unit 7 ("COMP2" standing for "Computation Unit") configured for computing a current lateral position Yc, from the current lateral speed $V_Y c$ and from the initial lateral position $Y_0$; and
a data transmission link 8 configured for transmitting at least one system of an assembly 9 of user systems ("USER" standing for "User systems") at least one of the following parameters: the current lateral speed $V_Y c$ computed by the computation unit 6 and/or the current lateral position Yc computed by the computation unit 7.

In a particular embodiment, the computation units 6 and 7 are integrated in a central processing unit (or computer) 10 which is connected by the intermediary of links 11, 12 and 8 to the units 3 and 5 and the assembly 9 respectively.

Moreover, the computation units 6 and 7 can, notably, correspond to functions implemented in a software manner in the central processing unit 10.

In a preferred embodiment, the assembly 9 of user systems comprises, in particular:
- an automatic pilot 13 ("AP" standing for "Automatic Pilot"); and
- a flight director 14 ("FD" standing for "Flight Director").

The estimations produced by the estimation device 1 can thus, notably, be used by the automatic pilot 13 whilst the aircraft is traveling on the ground and piloted in automatic mode, or they can be displayed by the flight director 14 whilst traveling on the ground, for example with manual piloting by a pilot.

Moreover, in a preferred embodiment, the data generation unit 3 comprises at least:
- an inertial data system 15 ("IRS" standing for "Inertial Reference System") of the aircraft; and
- a sensor 16 associated with a satellite positioning system, for example of the "GPS" ("GPS" standing for "Global Positioning System") or other (Galileo, Glonass, Beidou, . . . ) type.

Moreover, in a particular embodiment, the estimation device 1 comprises a processing unit 17 ("PROC1" standing for "Processing Unit") configured for monitoring the lateral position generated by the multimode receiver 4 when the aircraft is in flight, so as to be able to detect, if any, a noisy lateral position value. The data generation unit 3 considers a zero value for the initial lateral position in the event of detection of a noisy lateral position value transmitted by the multimode receiver 4.

Thus, if the estimation device 1 observes that the MMR data is noisy even in flight, it can force the value directly to zero. In this case, the aircraft is guided straight ahead, parallel with the longitudinal central axis L of the runway 2.

Moreover, in a particular embodiment, the estimation device 1 also comprises a processing unit 18 ("PROC2" standing for "Processing Unit") configured for comparing the value generated by the multimode receiver 4 with a recorded threshold value. The data generation unit 3 (or the central processing unit 10 for example) is configured for:
- if the generated value is less than or equal to the threshold value, choosing that generated value as the initial lateral position;
- otherwise, choosing an auxiliary value as the initial lateral position.

Preferably, the auxiliary value corresponds, as a function of the envisaged embodiment, to one or other of the following values:
- either to the threshold value itself;
- or to a zero value.

The processing units 17 and 18 can be integrated in the data generating unit 3, as shown in FIG. 1, or for example in the central processing unit 10.

Moreover, these processing units 17 and 18 can correspond to functions implemented in a software manner in the data generation unit 3.

Moreover, the estimation device 1 comprises, for example in the data generation unit 3, a monitoring unit 19 ("MONITOR" standing for "Monitoring Unit") which is configured for:
- carrying out at least one monitoring of the aircraft in such a way as to be able to detect at least one of the following events:
  - a compression of a main landing gear of the aircraft;
  - a putting of the wheels of the aircraft into rotation; and
  - a zero height of the aircraft with respect to the ground; and
- determining the time that the aircraft touches down on the runway, from the time of detection of at least one of the above events.

Moreover, the data generating unit 5 is configured for determining the current ground speed $V_{GND}$ of the aircraft and the current lateral angular deviation $\Delta\Psi$, from:
- either data obtained from inertial data generated by the inertial data system 15;
- or, preferably, hybridized data determined both from inertial data generated by the inertial data system 15 and from data generated by the sensor 16 of the satellite positioning system.

Thus, in a preferred embodiment, instead of using pure inertial data (IRS), the data generating unit 5 uses hybridized data (that is to say inertial data adjusted by GPS data), in order to significantly reduce the drift of the inertial data and to increase the accuracy. An estimated current lateral speed $V_Y c$ which is very accurate is then obtained.

The computation unit 6 is configured for computing the current lateral speed $V_Y c$ using the projection of the hybrid ground speed $V_{GND}$ (IRS+GPS) on the axis L of the runway 2. Once the lateral speed is found, the lateral position is easily determined by integrating the lateral speed. Thus, it is even guaranteed that the estimations of lateral position and of lateral speed are related, because the derivative of the lateral position actually gives the estimated lateral speed.

Consequently, in order to obtain the current lateral position Yc (or Yrollout), it suffices to integrate the current lateral speed $V_Y c$ (or VYrollout).

In order to do this, the computation unit 7 is configured for computing the current lateral position Yc, from the following expression:

$$Yc = \int V_Y c + Y_0$$

wherein:
- $V_Y c$ is the current lateral speed; and
- $Y_0$ is the initial lateral position.

The initialization constant, namely the initial position $Y_0$, is determined as mentioned above. It is known that in flight the MMR data is not interfered with, notably by the engine speed. This MMR data is therefore used for initializing the integrator. The computation unit 6 stores the lateral position sent by the multimode receiver 4 just before the impact (or just on impact), so that it will not pass through the phase where it is interfered with, and it is inserted in the above expression as corresponding to $Y_0$.

Moreover, in order to cover the cases where the multimode receiver is interfered with before the impact, a limit on the initialization value can be set. A criterion to be complied with can for example be that in 99% of cases (over the statistical impact performances with a cross-wind of 30 knots for example), even if the multimode receiver sends a completely incorrect value, the aircraft must not leave the runway.

Figure 3:
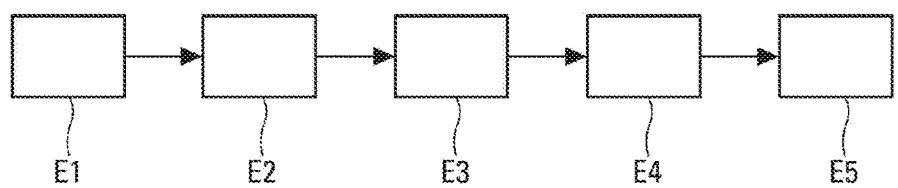
FIG. 3 is a block diagram of successive steps implemented by the estimation device.

The estimation device 1, as described above, implements the following set of steps E1 to E5, as shown in FIG. 3 (in liaison with FIG. 1):
- E1/ a data generation step, implemented by the data generating unit 3, comprising or consisting of determining the initial lateral position, corresponding to the lateral position value of the aircraft with respect to the central longitudinal axis of the runway, when touching down on the runway on landing;

E2/ a data generation step, implemented by the data generating unit 3, comprising or consisting of repetitively determining, at least from the time the aircraft touches down on the runway, the current ground speed of the aircraft and the current lateral angular deviation from hybridized data;

E3/ a computation step, implemented by the computation unit 6, comprising or consisting of repetitively computing the current lateral speed of the aircraft, from the current land speed and from the current lateral angular deviation;

E4/ a computation step, implemented by the computation unit 7, comprising or consisting of computing a current lateral position, from the current lateral speed and from the initial lateral position; and E5/ an information transmission step, implemented by the data transmission link 8, comprising or consisting of transmitting to at least one user system 13, 14: the current lateral speed computed in the first computation step and/or the current lateral position computed in the second computation step.

The estimation device 1, such as described above, notably makes it possible to produce a very accurate estimation of the lateral speed and of the lateral position of the aircraft on the ground whilst traveling after a landing.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating a current lateral speed and a current lateral position of an aircraft while the aircraft is traveling on a runway after a landing of the aircraft on the runway, the method comprising:

determining, using a first data generation unit, a lateral position value that represents an initial lateral position, wherein the initial lateral position corresponds to a lateral position value of the aircraft with respect to a central longitudinal axis of the runway at a time of the aircraft touching down on the runway on landing;

repetitively determining, at least from the time of the aircraft touching down on the runway upon landing, a current ground speed of the aircraft and a current lateral angular deviation from at least inertial information, wherein the current lateral angular deviation represents an angular deviation between a current route of the aircraft and a heading of the runway, and wherein repetitively determining the current ground speed and the current lateral angular deviation is performed using at least a second data generation unit;

repetitively computing, using a first computation unit, the current lateral speed of the aircraft from the current ground speed and the current lateral angular deviation of the aircraft;

computing, using a second computation unit, a current lateral position from the current lateral speed and the initial lateral position of the aircraft; and transmitting, using a data transmission link, one or more of the current lateral speed and the current lateral position to at least one user system of the aircraft.

2. The method as claimed in claim 1, wherein the first data generation unit comprises a multimode receiver.

3. The method of claim 2, comprising monitoring, using a first processing unit, a lateral position generated by the multimode receiver when the aircraft is in flight to detect a noisy lateral position value, wherein the first processing step is implemented by a first processing unit prior to determining the lateral position value, and wherein determining the lateral position value comprises determining a zero value for the initial lateral position, in case a noisy lateral position value is detected.

4. The method of claim 3, wherein determining the lateral position value comprises comparing a value generated by the multimode receiver with a threshold value and, when the value generated by the multimode receiver is less than or equal to the threshold value, using the value generated by the multimode receiver as the initial lateral position or, otherwise, using an auxiliary value as the initial lateral position.

5. The method of claim 4, wherein the auxiliary value corresponds to the threshold value or zero.

6. The method of claim 2, wherein determining the lateral position value comprises comparing a value generated by the multimode receiver with a threshold value and, when the value generated by the multimode receiver is less than or equal to the threshold value, using the value generated by the multimode receiver as the initial lateral position or, otherwise, using an auxiliary value as the initial lateral position.

7. The method of claim 1, wherein determining the lateral position value comprises:

monitoring the aircraft to detect one or more events, wherein the one or more events comprise at least one of:

a compression of a main landing gear of the aircraft;
a rotation of one or more wheels of the aircraft; and
a zero height of the aircraft relative to ground; and determining the time of the aircraft touching down on the runway during landing, from at least a time of detection of at least one of the one or more events.

8. The method of claim 1, wherein repetitively determining the current ground speed and the current lateral angular deviation comprises determining one or more parameters, wherein the one or more parameters comprise at least one of: the current ground speed of the aircraft and the current lateral angular deviation, from hybridized data obtained from inertial data and from data coming from a satellite positioning system.

9. The method of claim 1, wherein computing the current lateral position comprises using a following expression:

$$Yc = \int V_Y c + Y_0,$$

wherein $V_Y c$ is the current lateral speed and $Y_0$ is the initial lateral position.

10. The method of claim 1, wherein the at least one user system comprises one or more of an automatic pilot and a flight director.

11. The method of claim 10, comprising:
guiding the aircraft by the automatic pilot, based on the current lateral speed and/or the current lateral position; and/or
displaying, using the flight director, the current lateral speed and/or the current lateral position to a pilot of the aircraft.

12. A device for estimating a current lateral speed and a current lateral position of an aircraft while the aircraft is traveling on a runway after a landing of the aircraft on the runway, the device comprising:
a first data generation unit configured for determining a lateral position value that represents an initial lateral position, wherein the initial lateral position corresponds to a lateral position value of the aircraft with respect to a central longitudinal axis of the runway at a time of the aircraft touching down on the runway on landing;
a second data generation unit configured for repetitively determining, at least from the time of the aircraft touching down on the runway upon landing, a current ground speed of the aircraft and a current lateral angular deviation, wherein the current lateral angular deviation represents an angular deviation between a current route of the aircraft and a heading of the runway;
a first computation unit configured for repetitively computing the current lateral speed of the aircraft from the current ground speed and the current lateral angular deviation of the aircraft;
a second computation unit configured for computing a current lateral position from the current lateral speed and the initial lateral position of the aircraft; and
a data transmission link configured for transmitting one or more of the current lateral speed and the current lateral position to at least one user system of the aircraft.

13. The device of claim 12, wherein the first data generation unit corresponds to comprises a multimode receiver.

14. The device of claim 12, wherein the second data generation unit comprises at least an inertial data system and a sensor associated with a satellite positioning system.

15. The device of claim 12, wherein the at least one user system comprises one or more of an automatic pilot and a flight director.

16. The device of claim 15, wherein the automatic pilot is configured to:
guide the aircraft using one or more of the current lateral speed and the current lateral position; and/or
display one or more of the current lateral speed and the current lateral position to a pilot of the aircraft.

17. An aircraft comprising a device for estimating a current lateral speed and a current lateral position of an aircraft while the aircraft is traveling on a runway after a landing of the aircraft on the runway, the device comprising:
a first data generation unit configured for determining a lateral position value that represents an initial lateral position, wherein the initial lateral position corresponds to a lateral position value of the aircraft with respect to a central longitudinal axis of the runway at a time of the aircraft touching down on the runway on landing;
a second data generation unit configured for repetitively determining, at least from the time of the aircraft touching down on the runway upon landing, a current ground speed of the aircraft and a current lateral angular deviation, wherein the current lateral angular deviation represents an angular deviation between a current route of the aircraft and a heading of the runway;
a first computation unit configured for repetitively computing the current lateral speed of the aircraft from the current ground speed and the current lateral angular deviation of the aircraft;
a second computation unit configured for computing a current lateral position from the current lateral speed and the initial lateral position; and
a data transmission link configured for transmitting one or more of the current lateral speed and the current lateral position to at least one user system of the aircraft.

18. The aircraft of claim 17, wherein the at least one user system comprises one or more of an automatic pilot and a flight director.

19. The aircraft of claim 18, wherein:
the automatic pilot is configured to guide the aircraft using one or more of the current lateral speed and the current lateral position, and/or
the flight director is configured to display one or more of the current lateral speed and the current lateral position to a pilot of the aircraft.

* * * * *

UNITED STATES PATENT AND TRADEMARK OFFICE
CERTIFICATE OF CORRECTION

PATENT NO. : 10,121,385 B2
APPLICATION NO. : 15/364203
DATED : November 6, 2018
INVENTOR(S) : Fabien Guignard et al.

Page 1 of 1

It is certified that error appears in the above-identified patent and that said Letters Patent is hereby corrected as shown below:

In the Claims

Column 9, Line 50, Claim 13, delete "corresponds to" before "comprises"

Signed and Sealed this
Seventh Day of May, 2019

Andrei Iancu
*Director of the United States Patent and Trademark Office*